(12) United States Patent
Wendt et al.

(10) Patent No.: US 9,234,564 B2
(45) Date of Patent: Jan. 12, 2016

(54) CLOSURE ASSEMBLY, IN PARTICULAR FOR TYRE SKID CHAINS

(71) Applicant: ERLAU AG, Aalen (DE)

(72) Inventors: Rüdiger Wendt, Bobingen (DE); Mathis Weerts, Aalen (DE); Francesco Di Giusto, Mariano (IT)

(73) Assignee: ERLAU AG, Aalen (DE)

( * ) Notice: Subject to any disclaimer, the term of this patent is extended or adjusted under 35 U.S.C. 154(b) by 0 days.

(21) Appl. No.: 14/378,081

(22) PCT Filed: Nov. 15, 2012

(86) PCT No.: PCT/EP2012/072668
§ 371 (c)(1),
(2) Date: Aug. 11, 2014

(87) PCT Pub. No.: WO2013/117255
PCT Pub. Date: Aug. 15, 2013

(65) Prior Publication Data
US 2015/0121835 A1 May 7, 2015

(30) Foreign Application Priority Data
Feb. 10, 2012 (DE) .......................... 10 2012 101 099

(51) Int. Cl.
*F16G 15/00* (2006.01)
*F16G 15/04* (2006.01)
(Continued)

(52) U.S. Cl.
CPC ............... *F16G 15/04* (2013.01); *B60C 27/08* (2013.01); *B60C 27/10* (2013.01); *F16G 15/02* (2013.01)

(58) Field of Classification Search
CPC ......... F16G 15/02; F16G 15/04; B60C 27/06; B60C 27/08; B60C 27/10
USPC ............................................................ 59/85
See application file for complete search history.

(56) References Cited

U.S. PATENT DOCUMENTS 3,766,957 A * 10/1973 Witzel .......................... 152/242
5,878,565 A * 3/1999 Grootveld .......................... 59/85

FOREIGN PATENT DOCUMENTS

CH 179303 8/1935
CN 2854207 Y 1/2007
(Continued)

OTHER PUBLICATIONS

Prosecution Document, German Search Report mailed May 18, 2012, for International Application No. PCT/EP2012/072668, 5 pages.
(Continued)

*Primary Examiner* — David B Jones
(74) *Attorney, Agent, or Firm* — Dorsey & Whitney LLP

(57) ABSTRACT

The present invention relates to a closure assembly (1, 1') for closing a connecting link (100) of a tire chain, comprising at least one closure element (10, 10') that has at least one leg reception member (14, 14') configured to receive therein, at least sectionwise, a leg (101) of the connecting link (100). In addition, the present invention relates to a connecting link (100) for connecting at least two links of a tire chain, comprising two legs (101) that are interconnected via a yoke (108) as well as to a tire chain, in particular a tire protection chain. In order to allow the closure assembly (1, 1') to be secured to the connecting link (100) easily and in a repeatedly releasable manner, the closure element (10, 10') according to the present invention comprises a rotary lock reception member (11, 11') connected to the at least one leg reception member (14, 14') and including a rotary lock (50, 50'), which is arranged therein at least sectionwise and which, in its closed position (S), projects into the at least one leg reception member (14, 14') so as to lock the closure element (10, 10') in position on the leg (101), and at least one of the two legs (101) according to the present invention is provided with an engagement portion (104), which is configured for cooperating with a closure assembly (1, 1') according to the present invention.

13 Claims, 8 Drawing Sheets

(51) Int. Cl.
*B60C 27/10* (2006.01)
*F16G 15/02* (2006.01)
*B60C 27/08* (2006.01)

(56) References Cited

FOREIGN PATENT DOCUMENTS

| DE | 611524 | | 3/1935 |
|---|---|---|---|
| DE | 1931036 | U | 1/1966 |
| DE | 2061395 | A1 | 6/1972 |
| DE | 6609882 | U | 1/1973 |
| DE | 3632026 | A1 | 3/1987 |
| DE | 19652262 | A1 | 6/1998 |
| GB | 1485943 | A | 9/1977 |
| GB | 2180910 | A | 4/1987 |
| JP | 2005179890 | A | 7/2005 |
| WO | 2009/157917 | A1 | 12/2009 |

OTHER PUBLICATIONS

Prosecution Document, PCT Internatonal Search Report mailed Feb. 18, 2013, for international Application No. PCT/EP2012/072668; 2 pages.

\* cited by examiner

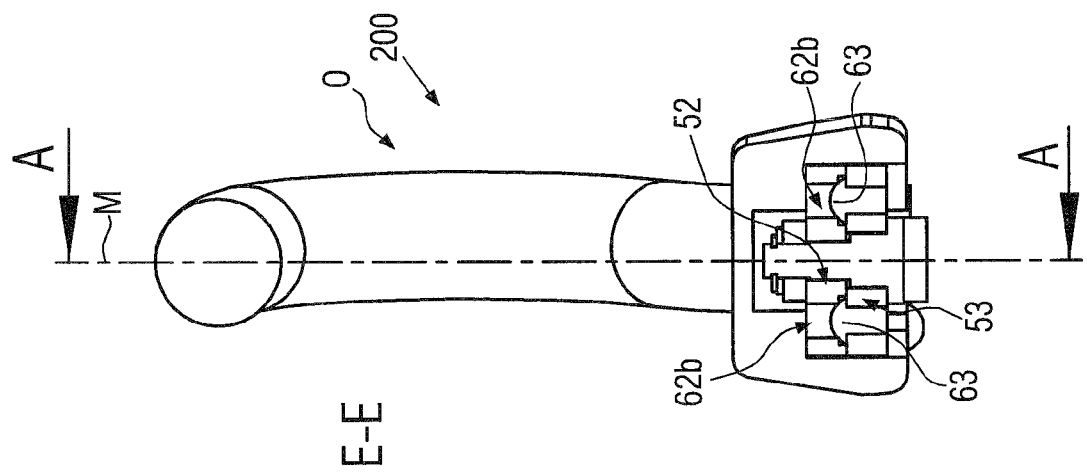
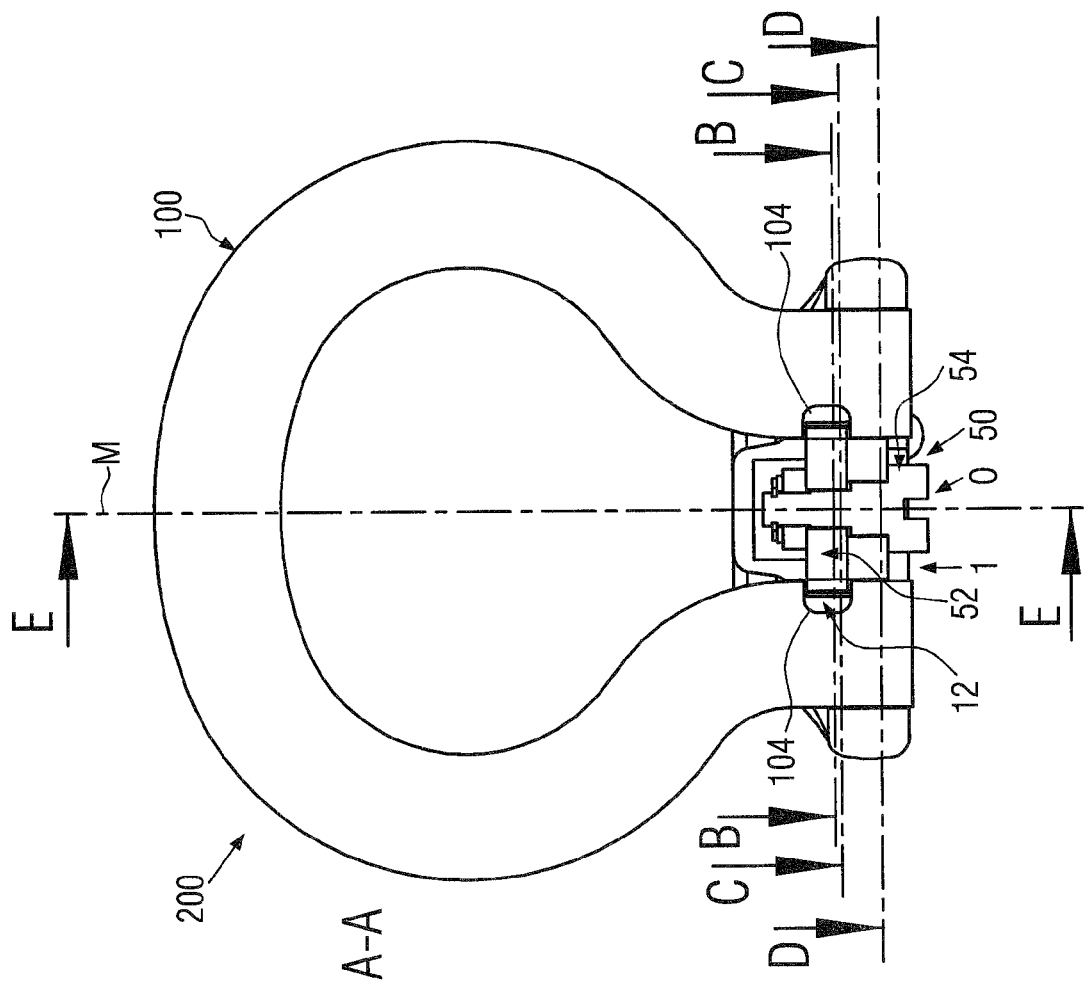

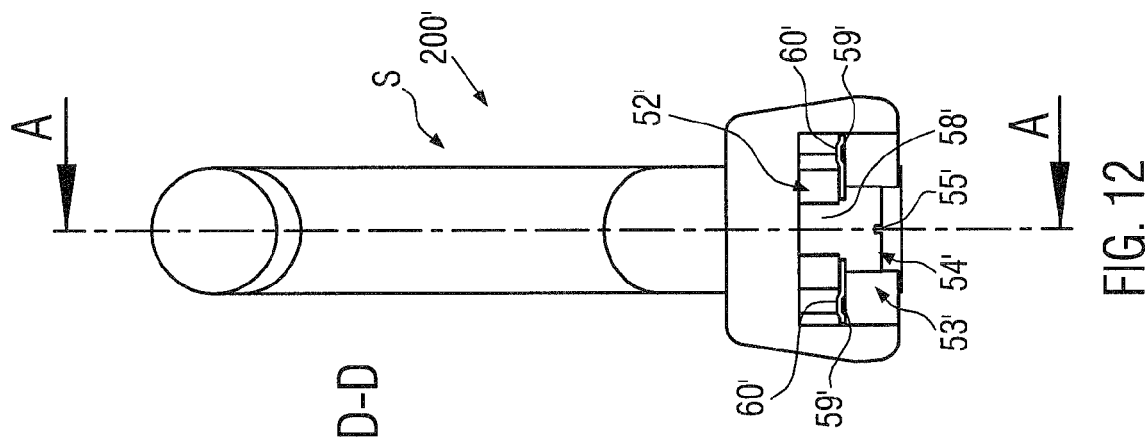
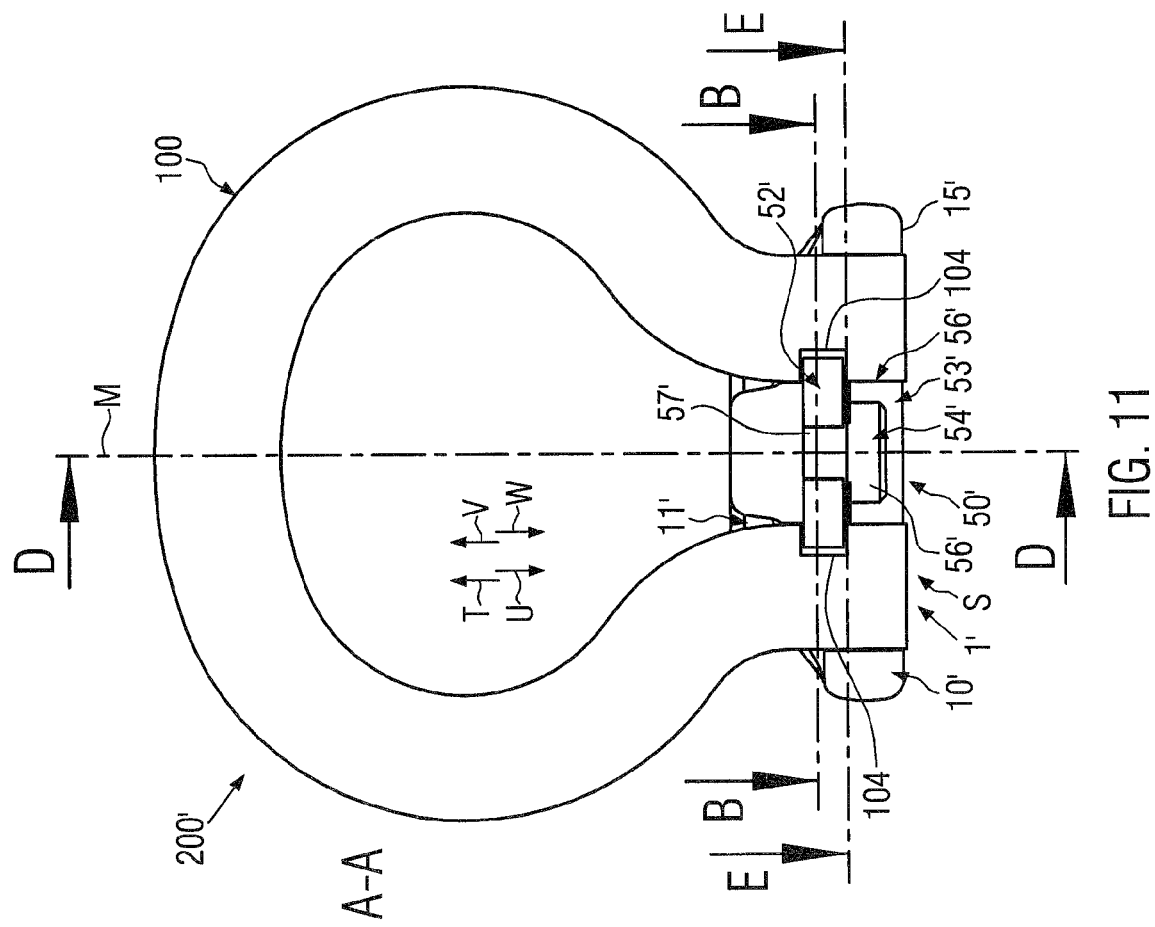
FIG. 12
FIG. 11

CLOSURE ASSEMBLY, IN PARTICULAR FOR TYRE SKID CHAINS

CROSS-REFERENCE TO RELATED APPLICATIONS

This application is the national stage application of International patent application No. PCT/EP2012/072668, entitled "Closure Assembly, In Particular for Tyre Skid Chains," and filed on Nov. 15, 2012, which claims priority to German application No. 102012101099.4, entitled "Closure Assembly, In Particular for Tyre Skid Chains" and filed on Feb. 10, 2012, which are hereby incorporated by reference herein in their entireties.

TECHNICAL FIELD

The present invention relates to a closure assembly for closing a connecting link of a tyre chain, comprising at least one closure element that has at least one leg reception member configured to receive therein, at least sectionwise, a leg of the connecting link.

In addition, the invention relates to a connecting link for connecting at least two links of a tyre chain to two legs connected to one another via a yoke.

Furthermore, the invention relates to a tyre chain, in particular a tyre protection chain.

BACKGROUND

Closure assemblies for closing connecting links of tyre chains as well as connecting links for connecting at least two links of tyre chains are known from the prior art. In the known closure assemblies the connecting link is provided with a kind of shoe as a closure element. The shoe defines between two jaws, which are formed at the respective ends thereof, a leg reception member for receiving therein a normally flattened end portion of the leg of the connecting link. The jaws of the leg reception member of the shoe as well as the flattened ends of the connecting link are provided with holes for receiving therein pins or bolts. In most cases, one end of the connecting link is permanently held through a connection pin in a leg reception member of the shoe in a pivotable manner. For closing the connecting link, the shoe is pivoted to its closed position where the holes in the jaws of its leg reception member are in alignment with the hole in the end of the leg. Subsequently, a clamping pin is driven into the aligned holes of the leg reception member and the leg end by means of a hammer.

The closure assemblies and connecting links known from the prior art are problematic when the clamping pin is hammered in, insofar as the tyre to be provided with the tyre chain does itself not offer any suitable base for supporting the connecting link so as to adequately take up the forces occurring during hammering. This may have the effect that the connecting link, after having been hit by a blow, may spring back from the tyre and assume a position that is unsuitable for the next blow. Closing the connecting link may thus be rendered more difficult and time consuming, and the clamping pin may get damaged if hit unfavorably by the hammer. Although a tyre iron may be placed below the connecting link or annular lock during hammering so as to provide a firm base for supporting the connecting link or annular lock on the tyre, however, his course of action is troublesome and unable to prevent a displacement of the connecting link during hammering and, moreover, it normally requires at least four hands.

Problems in addition to those arising during closing of the connecting link may arise during opening of the connecting link, which necessitates a removal of the clamping pin from the holes in the leg reception member and the leg end. On the one hand, removing the clamping pin may be rendered difficult by the fact that the clamping pin has been jammed-in or deformed due to mechanical loads and that, consequently, very high push-out forces have to be applied, which, due to the above-mentioned insufficient support of the connecting link, are hard to apply. On the other hand, the clamping pin and/or the hole accommodating said pin may be corroded. This corrosion may primarily have the effect that the pin gets stuck in the hole, whereby the forces required for knocking the pin out will be further increased. In addition, the pin may be weakened through corrosion such that it gets deformed during knocking out, whereby such knocking out will be rendered still more difficult or even impossible.

If it should no longer be possible to knock out the pin, the connecting link will have to be cut open, e.g. by means of a cutting torch. Cutting the connecting link open by means of a cutting torch will, however, entail the risk of causing damage to the tyre through the resultant heat. Such cutting open can therefore only be regarded as an emergency measure, if all the other efforts to open the connecting link by removing the pin should have failed.

SUMMARY

Taking into account the above-mentioned difficulties arising and efforts required during closing and opening of the connecting links known from the prior art, it is the object of the present invention to provide a connecting link that is adapted to be closed and opened easily and without applying major forces and a corresponding closure assembly for connecting links of tyre chains.

The closure assembly described herein, achieves this object in that the closure element comprises a rotary lock reception member connected to the at least one leg reception member and including a rotary lock, which is arranged therein at least sectionwise and which, in its closed position, projects into the at least one leg reception member so as to lock the closure element in position on the leg.

A connecting link according to the present invention is characterized in that at least one of the two legs is provided with an engagement portion, which is configured for cooperating with a closure assembly according to the present invention.

A tyre chain according to the present invention is characterized by a connecting link according to the present invention.

The solutions according to the present invention are advantageous insofar as the closure assembly and the rotary lock, respectively, can be operated by rotatively operating the rotary lock and moved from an open position to a closed position and from the closed position back to the open position. It is therefore not necessary to carry out any impact-like movements or hammer blows, which are required according to the prior art. In addition, the rotary lock and/or the rotary lock reception member may, at least sectionwise, consist of non-corrosive or corrosion-resistant materials, which prevent corrosion of the rotary lock and the rotary lock reception member or which can at least delay such corrosion, whereby the rotary lock can remain easily operable, even under adverse environmental influences, for a long period of time.

The solutions according to the present invention can arbitrarily be combined with the following additional embodiments, each individual one of which represents an advantageous embodiment, and improved still further:

For example, the rotary lock can easily be locked in the rotary lock reception member, when the rotary lock reception member includes a locking portion in which a locking body of the rotary lock is accommodated, and a retaining portion, in which a retaining member of the rotary lock is accommodated, said retaining member being rotatably connected to the locking body. The rotary lock reception member, in particular the locking portion, may intersect the leg reception member and/or overlap therewith, so as to allow the locking portion to engage the engagement portion on the leg of the connecting link in the closed position.

The rotary lock can be operated more easily, when the rotary lock reception member is configured such that it is accessible from outside in an attachment direction in which the closure element is attached to the connecting link. The rotary lock receptions may be configured such that it opens towards a lower surface of the closure element. There, a rotary lock accommodated in the rotary lock reception means is easily accessible on the one hand. On the other hand, the rotary lock accommodated in the rotary lock reception member is protected against damage through external influences, which normally act on the closure element from the side, since the closure element will normally rest on the tyre or on the ground with its lateral surfaces.

Inserting the rotary lock into the rotary lock reception member and removing it therefrom can be accomplished more easily, when, in a projection length along the insertion direction for inserting the rotary lock into the rotary lock reception member, the locking body is covered by the retaining member at an open position of the rotary lock. In other words, an outer contour of the retaining member can cover an outer contour of the rotary lock at the open position. Canting of the locking body during insertion of the rotary lock into and during removal of the rotary lock from the rotary lock reception member can be prevented in this way.

The retaining portion can be accommodated in the rotary lock reception member in a rotation-proof manner, i.e. such that it is secured against rotational displacement, in that an anti-rotation member is arranged on the inner circumferential side of the retaining portion, said anti-rotation member cooperating with a retaining element arranged on the outer circumferential side of the retaining member and securing the retaining member against rotation.

At least two legs of the connecting link can be locked in position in the closure assembly, when the rotary lock reception member is arranged centrally between two leg reception member of the closure element. The two leg reception member can thus be connected to the rotary lock reception member and respective legs of the connecting link arranged in the leg reception member can be locked in position simultaneously.

The rotary lock can easily be operated, when an operating member, which is connected to the locking body in a torsionally rigid manner, is arranged such that it is freely accessible from outside. The operating member can thus easily be accessed by an operating tool and the rotary lock can be operated.

The structural design of a rotary lock according to the present invention can be simplified, when the operating member is formed on a rotary axle on which the locking body and the retaining member are arranged. The operating member can thus execute a dual function in that it extends e.g. through the retaining member, for which it constitutes a kind of rotary axle, and is connected to the locking body in a torsionally rigid manner. The operating member and the rotary axle may e.g. be formed integrally with one another. An arbitrarily configured tool reception means, such as a square, a hexagon or other form fit elements, which may be formed on the inner or on the outer side of the operating member, can be used as an operating member.

An arrival at the closed position can easily be indicated and, in addition, the locking body can be locked in the closed position, when the locking body includes at least one locking element and the retaining member includes at least one counter latching element, the at least one latching element lockingly engaging, at least in the closed position of the rotary lock, the at least one counter latching element and the locking body being secured against rotation relative to the retaining member. The latching element may, for example, be configured as a ball or a spherical cap, and the counter latching element may, for example, be configured as an opening, recess or indentation, and vice versa. A respective further latching element and counter latching element may be provided for locking or arresting the locking body in the open position, thus indicating that the open position has been reached and locking the locking body at the open position. For guiding the latching element and the counter latching element more easily and more precisely, at least one of these two elements may be configured e.g. as an elongate hole or a circular elongate hole, along which the latching element or the counter latching element is displaceably guided.

The locking body can be arranged on the retaining member with the least possible amount of play, when at least one spring element urges the locking body towards the retaining member. Using a spring element in this way, may additionally facilitate locking of the locking body on the retaining member or allow the latching element to lockingly engage or snap into engagement with the counter latching element, or at least facilitate this kind of engagement.

The spring element can be produced in a particularly easy manner and will be particularly resistant to detrimental environmental influences, soiling and corrosion, when the spring element comprises at least one elastomeric body. The elastomeric body can fulfil the spring function of the spring element. The elastomeric body may, for example, allow the spring element to be configured as a compression spring. In addition, the spring element in its entirety may consist of a single elastomeric body or of a plurality of elastomeric bodies.

The retaining element on the retaining member can be configured in a particularly simple manner, when the retaining element is configured as a retaining recess. The retaining recess can be brought into engagement with the anti-rotation member of the retainer reception means in the connecting element.

A locking and a release function of the rotary lock can be realized easily, when the locking body comprises at least one locking portion and, in the closed position, at least one release portion, a locking diameter of the locking portion being larger than a release diameter of the release portion. The locking portion can thus project into the leg reception member with its diameter that is enlarged in comparison with that of the release portion.

In the following, the present invention will be described exemplarily on the basis of possible embodiments making reference to the enclosed drawings. The combinations of features shown in connection with these embodiments only serve the purpose of illustration. Individual features may also be omitted in accordance with their above-described advantages, if the advantage accomplished by the respective feature should be irrelevant for specific cases of use.

BRIEF DESCRIPTION OF THE DRAWINGS

FIG. 6 is a schematic cross-sectional view of a connecting link according to the present invention with a closure assembly according to the present invention at the open position along section line A-A shown in FIG. 7.

FIG. 7 is a schematic cross-sectional view of the connecting link according to the present invention shown in FIG. 6, with the closure assembly, along section line E-E shown in FIG. 1.

FIG. 11 is a schematic cross-sectional view of a further embodiment of a connecting link according to the present invention with a closure assembly according to the present invention at a closed position along section line A-A shown in FIG. 12.

FIG. 12 is a schematic cross-sectional view of the connecting link shown in FIG. 11 and of the closure assembly along section line D-D shown in FIG. 11.

DETAILED DESCRIPTION

Figure 2:
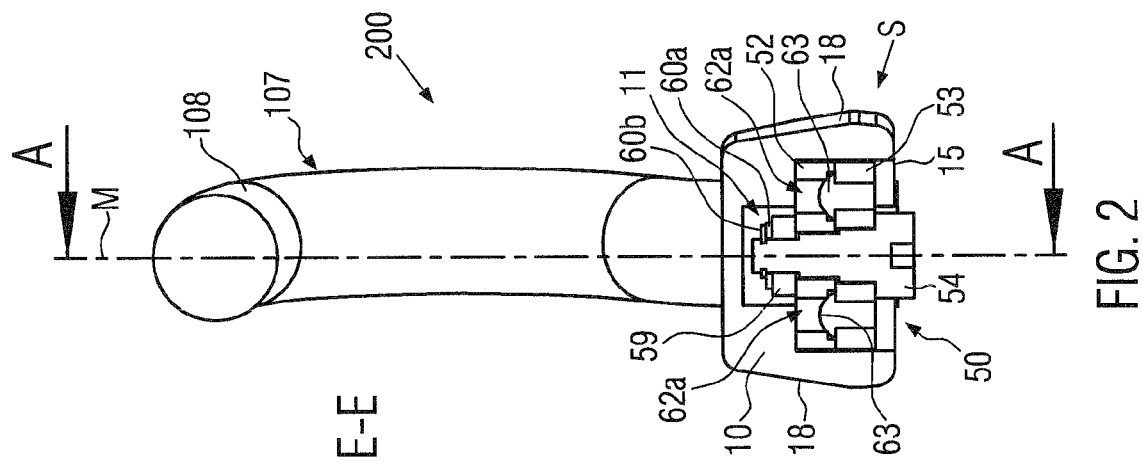
FIG. 2 is a schematic cross-sectional view of the connecting link shown in FIG. 1, with the closure assembly, along section line E-E shown in FIG. 1.
Figure 1:
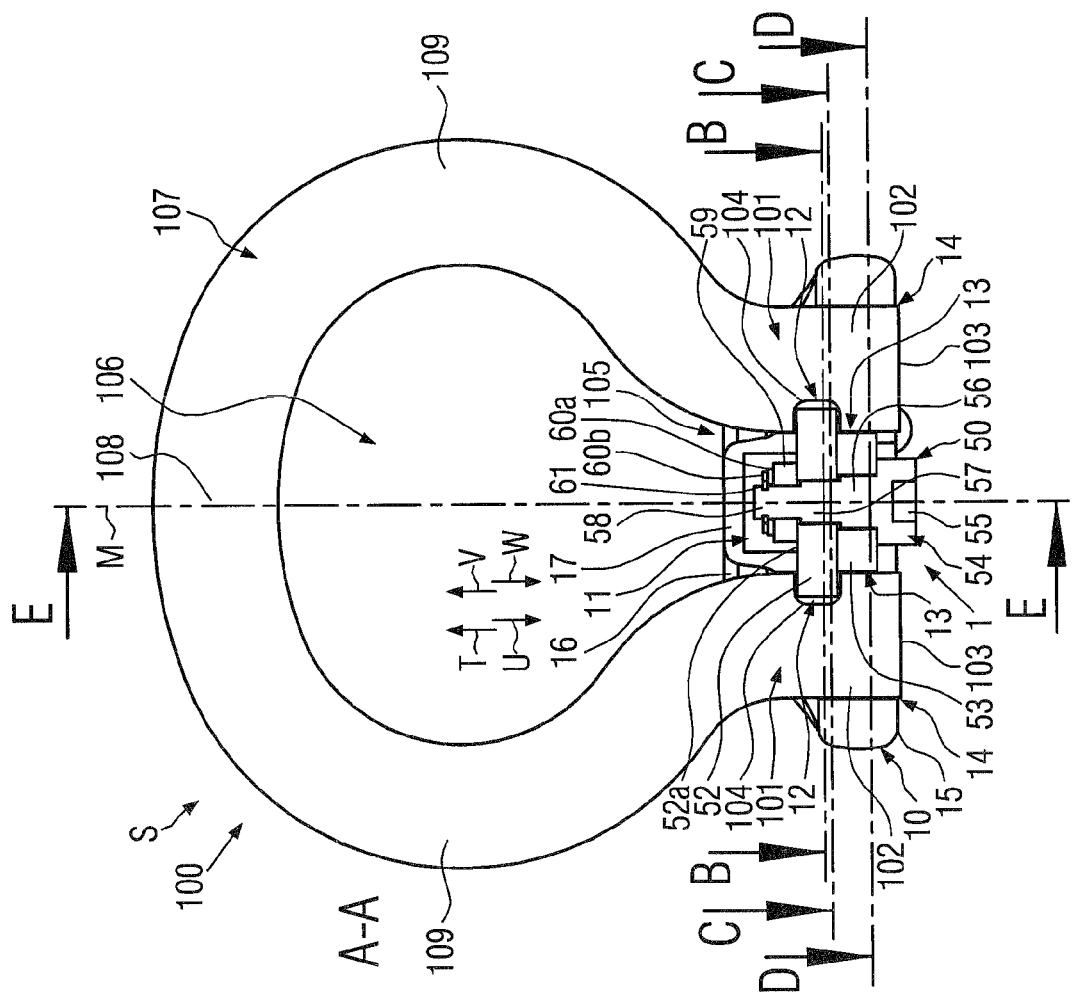
FIG. 1 is a schematic cross-sectional view of a connecting link according to the present invention with a closure assembly according to the present invention at the closed position along section line A-A shown in FIG. 2.

FIG. 1 shows, in a schematic cross-sectional view along section line A-A shown in FIG. 2, a closure assembly 1 according to the present invention installed in a closed position S in a connecting link 100 according to the present invention. The closure assembly 1 and the connecting link 100 together define an annular lock 200 according to the present invention.

The closure assembly 1 comprises a closure element 10 and a rotary lock 50. The rotary lock 50 is arranged in a rotary lock reception member 11 of the closure element 10 between two legs 101, more precisely between straight end portions 102 of the legs 101. The rotary lock reception member 11 opens in a direction opposite to an insertion direction V, in which the rotary lock 50 is insertable into the rotary lock reception member 11. In a removal direction W directed opposite to the insertion direction V, the rotary lock 50 can be removed from the rotary lock reception member 11. The closure element 10 is adapted to be attached to the connecting link 100 in an attachment direction T and to be detached from the connecting link 100 in a detachment direction U, provided that the rotary lock 50 occupies an open position O that will be explained later on.

The rotary lock reception member 11 comprises a locking portion 12 and a retaining portion 13 arranged in front of the locking portion 12 when seen in the insertion direction V. A locking body 52 of the rotary lock 50 is accommodated in the locking portion 12. A retaining member 53 of the rotary lock 50 is accommodated in the retaining portion 13. The leg reception member 14 may include two leg reception apertures of the closure element 10 accommodate a respective one of the end portions 102 of the legs 101 of the connecting link 100. Free ends 103 of the end portions 102 project to a minimum extent downwards from a lower surface 15 of the closure element 10. The end portions 102 have formed therein respective engagement portions 104 of the connecting link 100. At the closed position S shown in FIG. 1, the locking body 52 of the rotary lock 50 engages these engagement portions 104 thus retaining and locking the legs 101 of the connecting link 100 in the leg reception member 14 of the closure element 10.

In addition, the leg reception member 14 is interconnected via a connection portion 16 of the closure element 10, said connection portion 16 bridging the rotary lock reception member 11 functioning as a cross piece. The rotary lock reception member 11 is closed at the top, i.e. opposite to the insertion direction V for the rotary lock 50, by a cover portion 17 of the closure element 10 surrounding the upper portion of the rotary lock reception member 11 in a pot-shaped manner. The rotary lock 50 is thus, at least sectionwise, accommodated in the rotary lock reception member 11 and protected against detrimental environmental influences.

The rotary lock 50 is, in the insertion direction V, inserted in the rotary lock reception member 11 in an opening 105 of the connecting link 100 defined between the two legs 102. An operating member 54 of the rotary lock 50 projects in a direction opposite to the insertion direction V, i.e. in the removal direction W, downwards from the rotary lock 50 and beyond the lower surface 15 of the closure element 10. An operating element 55 directed in the removal direction W is formed on the operating member 54 in the form of a slot, which is adapted to have inserted therein e.g. an operating tool in the form of a flat-blade screwdriver, so that a form-fit engagement between the operating tool (not shown) and the operating element 55 allows the operating element 55 to be rotated about a center axis M of the rotary lock 50 representing simultaneously also a center axis M of the closure element 10 and of the connecting link 100.

The operating member 54 is, in a torsionally rigid manner, connected to a retaining area 56 of the rotary lock 50 extending through the retaining member 53, said retaining member 53 being supported on the retaining area 56 such that it is rotatable around the center axis M. A locking area 57 following the retaining area 56 is connected to the retaining area 56 in a torsionally rigid manner and extends through the locking body 52. The locking body 52 is connected to the locking area 57 in a torsionally rigid manner, e.g. in that the locking body 52 is press-fitted onto the locking area 57 and/or is connected to the locking body 52 by a form-fit connection, a force-fit connection and/or a substance-to-substance bond. The locking area 57 is followed by a spring area 58, which is connected to the locking area 57 in a torsionally rigid manner and which is used for accommodating a spring element 59. The spring area 58 extends through the spring element 59. The spring element 59 rests on an upper surface 52a of the locking body 52 in the removal direction W. In the insertion direction V, the spring element 59 rests via a support element 60a in the form of a washer on an arresting element 60b in the form of a spring washer on the spring area 58. The arresting element 60b is accommodated in an arresting aid 61 formed on the spring area 58 as an annular groove.

In addition, the connecting link 100 includes a reception area 106, which opens and widens in the attachment direction T and in the insertion direction V after the opening 105 for accommodating chain links (not shown). The reception area 106 is enclosed by an annular portion 107 of the connecting link 100. The annular portion 107 comprises two ring halves 109 interconnected by a yoke 108.

FIG. 2 shows the annular lock 200 according to FIG. 1 in a schematic cross-sectional view along the section line E-E shown in FIG. 1. Here, it can be seen that the locking body 52 is provided with two latching elements 62a, 62b, each of said two latching elements 62 a, 62b being in engagement with one of two counter latching elements 63 provided on the retaining member 53. The locking body 52 is thus arrested on the retaining member 53 in the closed position S.

In addition, it can be seen in FIG. 2 that the closure element 10 has formed thereon lateral surfaces 18, which extend at a flat angle to the center axis M and which are therefore almost in alignment with outer sides of the yoke 108 of the connecting link 100, thus allowing the annular lock 200 to rest, as smoothly as possible and free from notches, on a tyre (not shown) provided with a tyre chain according to the present invention.

Figure 3:
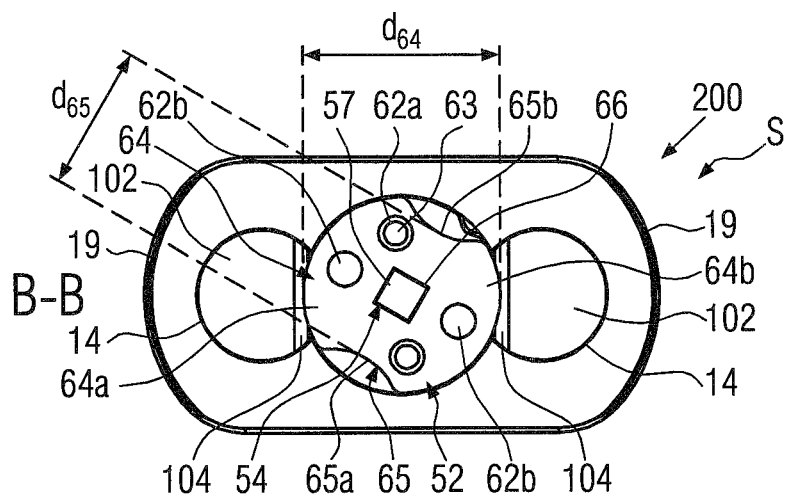
FIG. 3 is a schematic cross-sectional view of the connecting link according to the present invention shown in FIG. 1, with the closure assembly according to the present invention, along section line B-B shown in FIG. 1.

FIG. 3 shows the annular lock 200 at the closed position S in a schematic cross-sectional view along the section line B-B shown in FIG. 1. Here, it can clearly be seen that the locking body 52 comprises a locking portion 64 and a release portion 65. The locking portion comprises two locking elements 64a, 64b, which, in the closed position, project into the leg reception member 14 and engage the engagement portions 104. The release portion 65 is provided with two release elements 65a, 65b in the form of recesses. Due to the recesses 65a, 65b a diameter $d_{65}$ of the release portion 65 is smaller than a diameter $d_{64}$ of the locking portion 64.

FIG. 3 additionally illustrates that the locking body 52 comprises, in addition to the latching elements 62a cooperating with the counter latching elements 63 on the retaining member 53 at the closed position S, further latching elements 62b cooperating with the counter latching elements 63 in the open position O, as will be explained in more detail below. Furthermore, FIG. 3 illustrates that the locking area 57 of the operating member 54 is configured as a square engaging an operating opening 66 of the locking body 52 in a form fit manner, said operating opening 66 being configured as a female square. In addition, it can be seen in FIG. 3 that end faces 19 of the closure element 10 are rounded so as to reduce notching effects of the closure element 10.

Figure 4:
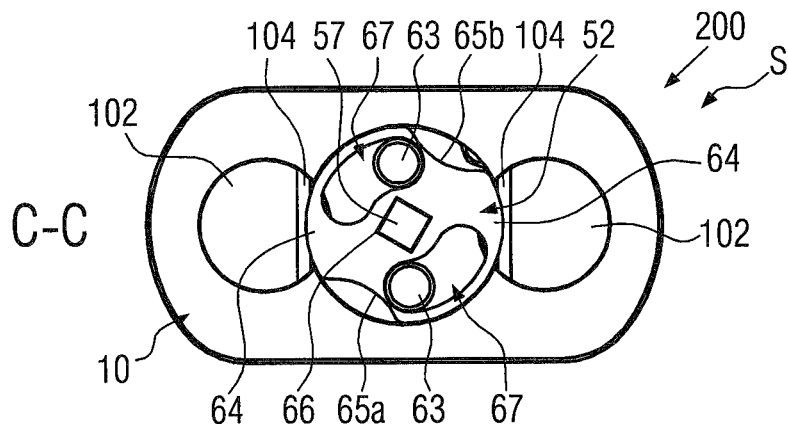
FIG. 4 is a schematic cross-sectional view of the connecting link according to the present invention shown in FIG. 1, with the closure assembly according to the present invention, along section line C-C shown in FIG. 1.

FIG. 4 shows the annular lock 200 in a schematic cross-sectional view along the section line C-C shown in FIG. 1. Here, it can clearly be seen that the locking body 52 is provided with two guide means 67 in the form of elongated holes or circular elongated holes, which define a segment of a circle and in which counter latching elements 63 attached to the retaining member 53 are guided.

Figure 5:
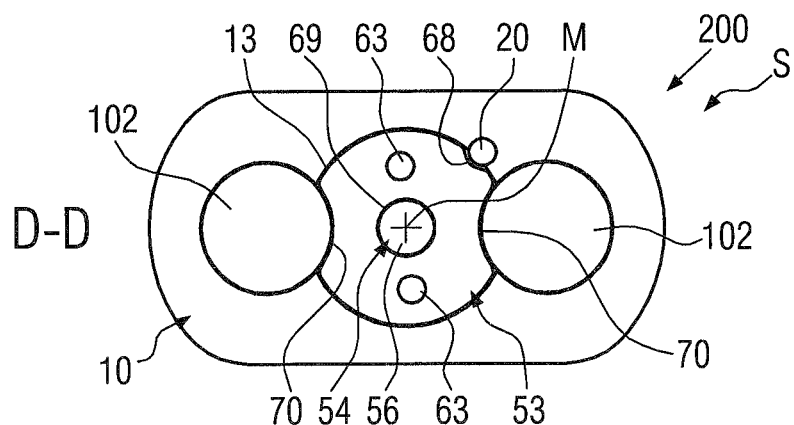
FIG. 5 is a schematic cross-sectional view of the connecting link according to the present invention shown in FIG. 1, with the closure assembly according to the present invention, along section line D-D shown in FIG. 1.

FIG. 5 shows the annular lock 200 in a schematic cross-sectional view along the section line D-D shown in FIG. 1. Here, it is shown that the retaining portion 13 of the rotary lock reception member 11 is provided with an anti-rotation member 20 in the form of an anti-rotation member 20 projecting with its cylindrical outer contour into the retaining portion 13. The anti-rotation member 20 engages a retaining element 68, which is formed on the retaining member 53, in the form of a retaining element 68 configured as an opening, which is complementary to the part of the anti-rotation member 20 projecting into the retaining portion 13. The retaining member 53 is thus secured against rotation around the center axis M in the retaining portion 13. In addition, FIG. 5 illustrates clearly that the retaining area 56 of the operating element 64 has a circular outer contour, which is accommodated in a retaining opening 69 of the retaining member 53, said retaining opening 69 being circular in shape as well.

FIG. 6 shows the annular lock 200 with the closure assembly 1 in the open position O. In the open position O, the operating member 54 and the locking body 52 connected thereto in a rotation-proof manner have been rotated around the center axis M by a predetermined angle of rotation, so that the locking body 52 has been moved out of engagement with the engagement portions 104 of the connecting link 100.

FIG. 7 illustrates that, in the open position O, the additional latching elements 62b of the locking body 52 are in locking engagement with the counter latching elements 63 of the retaining member 53 and that the locking body 52 is thus secured against rotation around the center axis M.

Figure 8:
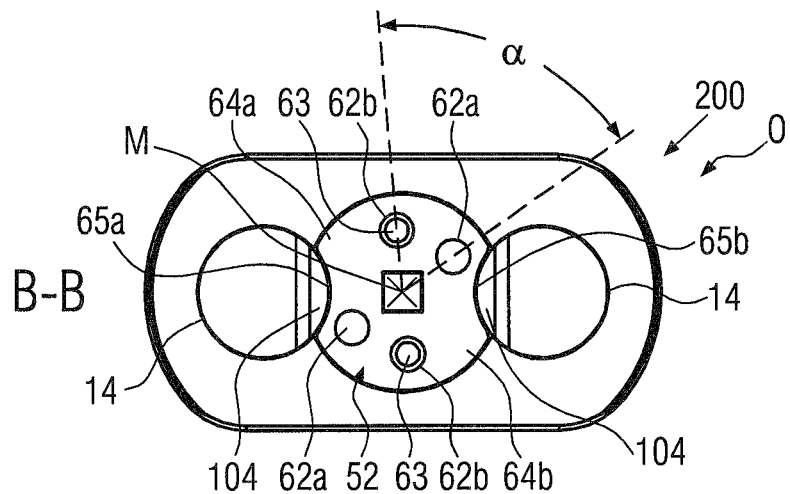
FIG. 8 is a schematic cross-sectional view of the connecting link according to the present invention shown in FIG. 6, with the closure assembly according to the present invention, along section line B-B shown in FIG. 1.

FIG. 8 shows the annular lock 200 in the open position O in a schematic cross-sectional view along the section line B-B shown in FIG. 6. Here, it can clearly be seen that in the open position O, in a projection along the center axis M and along the attachment direction T and the insertion direction V, the release elements 65a and 65b are in alignment with the leg reception member 14 and that, at the same time, the locking elements 64a, 64b have been moved out of engagement with the engagement portions 104 of the connecting link 100. The rotary lock 50 can thus easily be removed from the rotary lock reception member 11 in the removal direction W at the open position O. Subsequently or simultaneously, the closure element 10 can be detached from the legs 101 of the connecting link 100 in the detachment direction U. FIG. 8 additionally illustrates that for transferring the rotary lock 50 from the closed position S shown in FIGS. 1 to 5 to the open position O shown in FIGS. 6 to 10, a rotation of from 45° to 75°, preferably approx. 60°, around the center axis M will be necessary.

Figure 9:
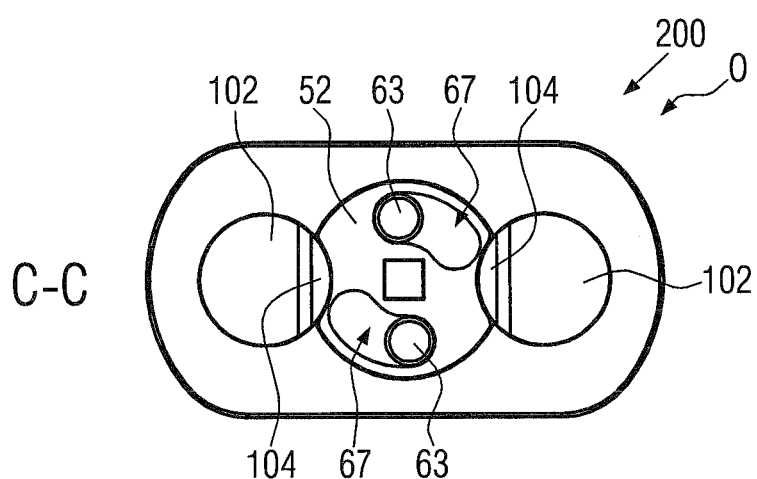
FIG. 9 is a schematic cross-sectional view of the connecting link according to the present invention shown in FIG. 6, with the closure assembly according to the present invention, along section line C-C shown in FIG. 1.

FIG. 9 shows the annular lock 200 at the open position O in a schematic cross-sectional view along the section line C-C shown in FIG. 6. Here, it can clearly be seen that, due to the rotation of the locking body 52 from the closed position S to the open position O, the guide means 67 have been moved along the counter latching elements 63.

Figure 10:
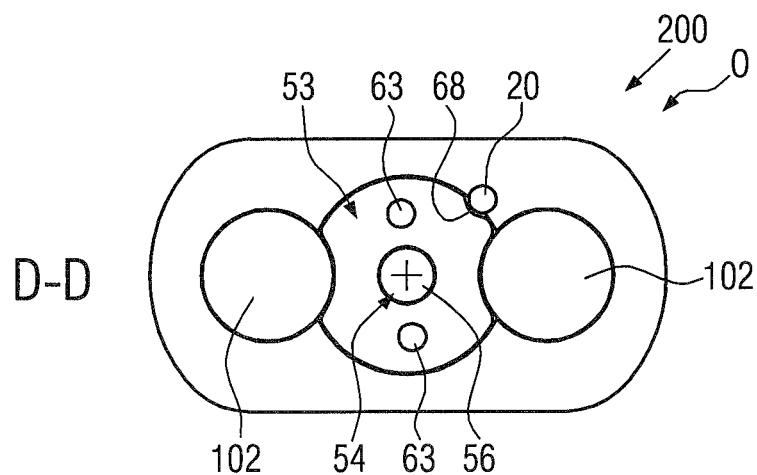
FIG. 10 is a schematic cross-sectional view of the connecting link according to the present invention shown in FIG. 6, with the closure assembly according to the present invention, along section line D-D shown in FIG. 1.

FIG. 10, which shows the annular lock 200 in a schematic cross-sectional view along the section line D-D shown in FIG. 6, illustrates that in the plane of the retaining member 53 no rotation relative to the closed position S has taken place in the open position O and that the retaining member 53 maintained its rotary position due to the engagement between the anti-rotation member 20 and the retaining element 68.

FIG. 11 shows a further embodiment of an annular lock 200' at the closed position S, said annular lock 200' comprising the connecting link 100 and a further embodiment of a closure assembly 1' according to the present invention. The closure assembly 1' comprises a further embodiment of a closure element 10' according to the present invention as well as a further embodiment of a rotary lock 50' according to the present invention.

Similar to the rotary lock 50, the rotary lock 50' comprises a locking body 52', which projects into the engagement portions 104 of the connecting link 100 in the closed position S and which thus keeps the closure assembly 1' locked on the connecting link 100. To this end, the rotary lock 50' is accommodated in a rotary lock reception member 11' providing, in addition to a locking area 57' having the locking body 52' arranged therein, a retaining area 56' in which a retaining member 53' of the rotary lock 50' is accommodated. Analogously to the rotary lock 50, the rotary lock 50' includes an operating member 54', which is arranged such that it is accessible from a lower surface 15' of the closure element 10' in the attachment direction T and in the insertion direction V. Other than the operating member 54 of the rotary lock 50, the operating member 54' does not project beyond the lower surface 15' of the closure element 10' and is therefore accommodated in the rotary lock reception member 11' such that it is well protected against mechanical impacts.

A retaining area 56' of the operating member 54' is, on the level of the retaining member 53, rotatably accommodated in the latter in the attachment direction T and in the insertion direction V. A locking area 57' of the operating member 54' is, on the level of the locking body 52', connected to the latter in a rotation-proof manner in the attachment direction T and in the insertion direction V.

FIG. 12 shows the annular lock 200' in a schematic cross-sectional view along the section line D-D shown in FIG. 11. Here, it can clearly be seen that two spring elements 59' attached to the retaining member 53' engage support elements 60' in the form of guide means of the locking body 52', said spring elements 59' raising the locking body 52' from the retaining member 53' to an extent corresponding to the height of a spring area 58' of the operating member 54'. FIG. 12 additionally shows an operating element 55' of the operating member 54' in the form of a simple slot, which is configured to cooperate with an operating tool (not shown) that may be configured e.g. as a flat-blade screwdriver.

Figure 13:
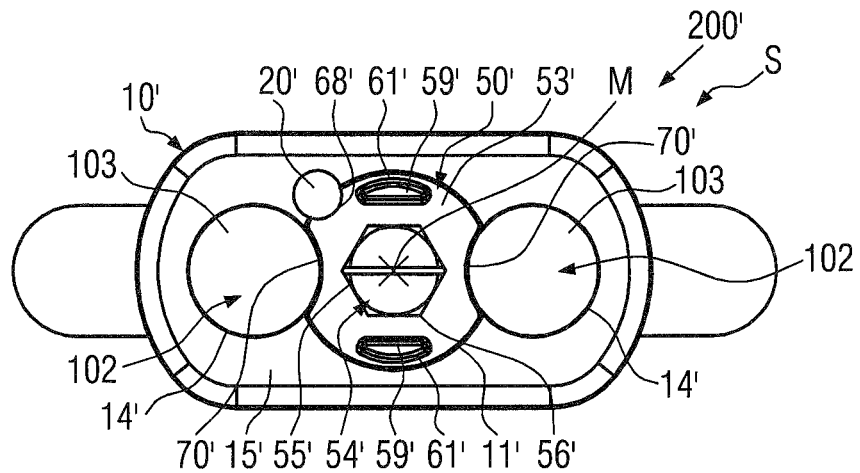
FIG. 13 is a schematic view from below of the connecting link shown in FIG. 11, with the closure assembly.

FIG. 13 shows the annular lock 200' seen from below in the attachment direction T and in the insertion direction V, so that the lower surface 15' of the closure element 10', the lower surface of the rotary lock 50' with the operating member 54' including its operating element 55' as well as the free ends 103 of the end portions 102 of the connecting link 100 can be seen. An anti-rotation member 20' of the closure element 10', which is formed on the inner circumferential side in the rotary lock reception member 11' and which projects into said rotary lock reception member 11', engages a retaining element 68' of the retaining member 53' thus securing the retaining member 53' against rotation around the center axis M. Similar to the retaining member 53, the retaining member 53' includes recesses 70' for the end portions 102 of the legs 101. The operating member 54' has, in a projection along the attachment direction T and the insertion direction V, a circular circumference in the retaining area 56' and is thus rotatably accommodated in said retaining area 56'. The spring elements 59' are accommodated in respective arresting aids 61' in the form of openings where they can be installed, in the form of elastomeric bodies, by casting-in or by press-fitting.

Figure 14:
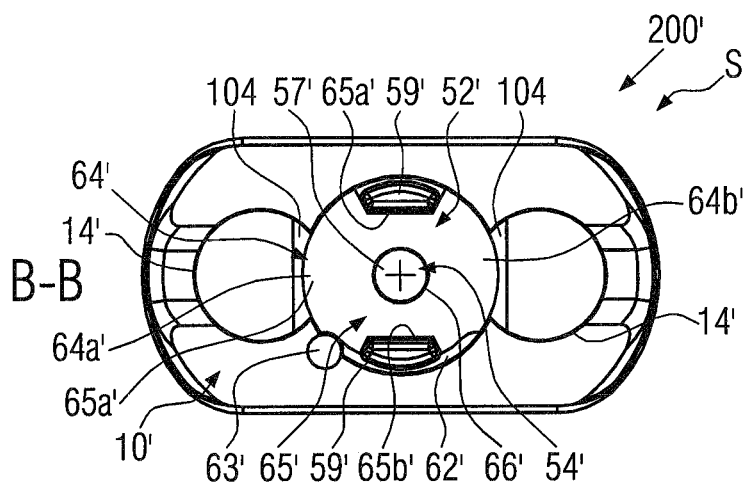
FIG. 14 is a schematic cross-sectional view of the connecting link shown in FIG. 11, with the closure assembly, along section line B-B shown in FIG. 11.

FIG. 14 shows the annular lock 200' in a schematic cross-sectional view along the section line B-B shown in FIG. 11. Here, it can be seen that locking elements 64a', 64b' of a locking portion 64' of the locking body 52' project into the leg reception member 14' and engage the engagement portions 104. Release elements 65a', 65b' of a release portion 65' of the locking body 52' lockingly cooperate with the spring elements 59'. In addition, the locking body 52' is provided with a latching element 62' enveloping the outer circumference of the locking body 52' to an extent corresponding to the magnitude of a rotary angle change for transferring the locking body 52' from the closed position S to the open position O. The latching element 62' cooperates with a counter latching element 63' which, analogous to the anti-rotation member 20', is configured as a bolt whose cylindrical outer contour projects into the rotary lock reception member 11'. The spring element 59' arranged on the release element 65b' and thus acts as a further locking element insofar as it has to be moved past the latching element 63', while undergoing elastic deformation, when the locking body 52' is guided from the closed position S to the open position O and vice versa.

In addition, FIG. 14 shows that, just as the operating opening 66', the locking area 57' of the operating member 54' is circular in shape. For establishing a rotation-proof connection, the locking body 52' may be press-fitted onto the locking area 57'. Also, an interference fit between the locking body 52' and the locking area 57' of the operating member 54' may also be used.

Figure 15:
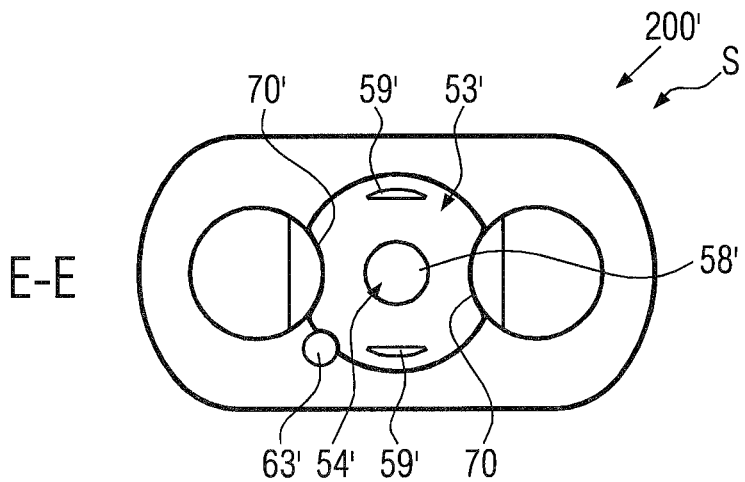
FIG. 15 is a schematic cross-sectional view of the connecting link shown in FIG. 11, with the closure assembly, along section line E-E shown in FIG. 11.

FIG. 15 shows the annular lock 200' in a schematic cross-sectional view along the section line E-E shown in FIG. 11. Similar to FIG. 13, the recesses 70' on the retaining member 53' can be seen. In addition, the portions of the spring elements 59' shown in FIG. 12 as well as the spring area 58' of the operating member 54' can be seen in FIG. 15. Similar to FIG. 12, FIG. 15 also shows that the spring area 58' has a slightly increased diameter in comparison with the operating opening 66', whereby the locking body 52' rests on a kind of shoulder.

Figure 17:
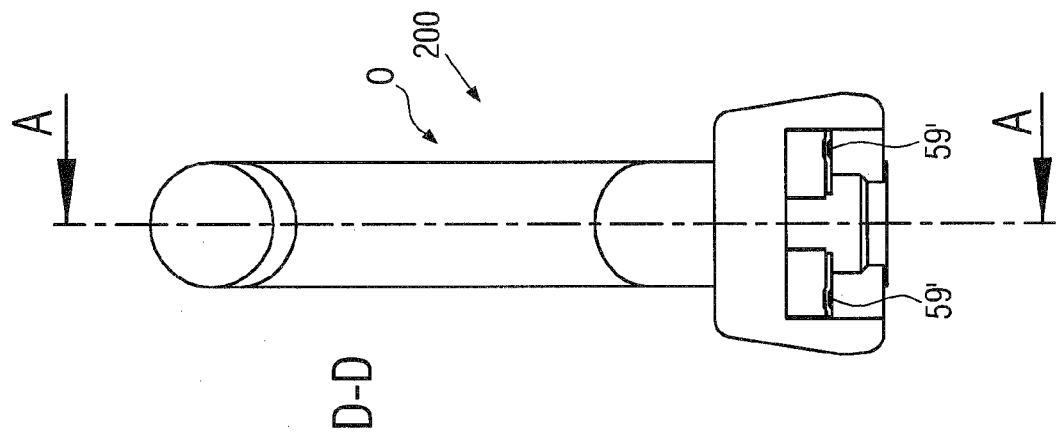
FIG. 17 is a schematic cross-sectional view of the connecting link shown in FIG. 16 and of the closure assembly along section line D-D shown in FIG. 11.
Figure 16:
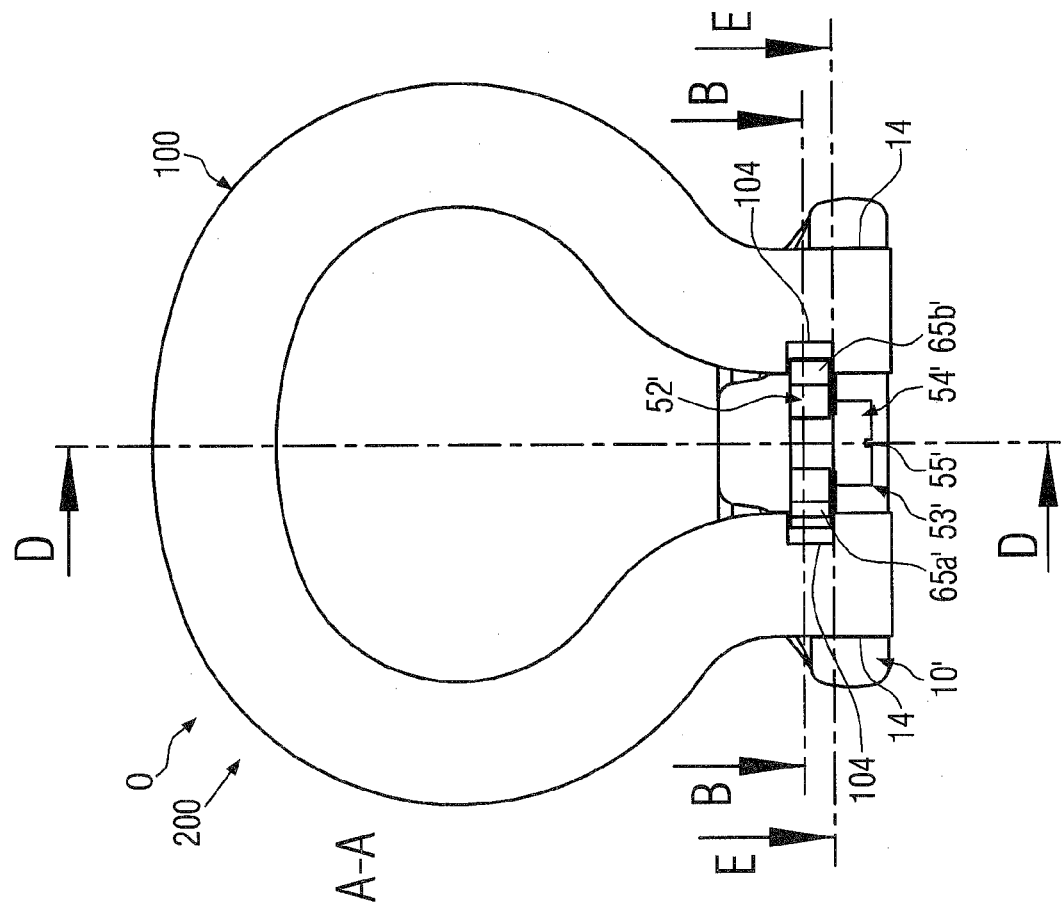
FIG. 16 is a schematic cross-sectional view of a further embodiment of a connecting link according to the present invention with a closure assembly according to the present invention at an open position along section line A-A shown in FIG. 17.

FIG. 16 shows the annular lock 200' in a schematic cross-sectional view along the section line A-A shown in FIG. 17, in the open position O. In the open position O, the locking body 52' has been rotated around the center axis M such that the release elements 65a', 65b' are in alignment with the leg reception member 14' of the closure element 10' and the locking elements 64a', 64b' are moved out of engagement with the engagement portions 104 of the connecting link 100.

FIG. 17 shows the annular lock 200' in a schematic cross-sectional view along the section line D-D shown in FIG. 16. Here, it can be seen that the spring elements 59' have been turned out of the respective support elements 60' and reception means.

Figure 18:
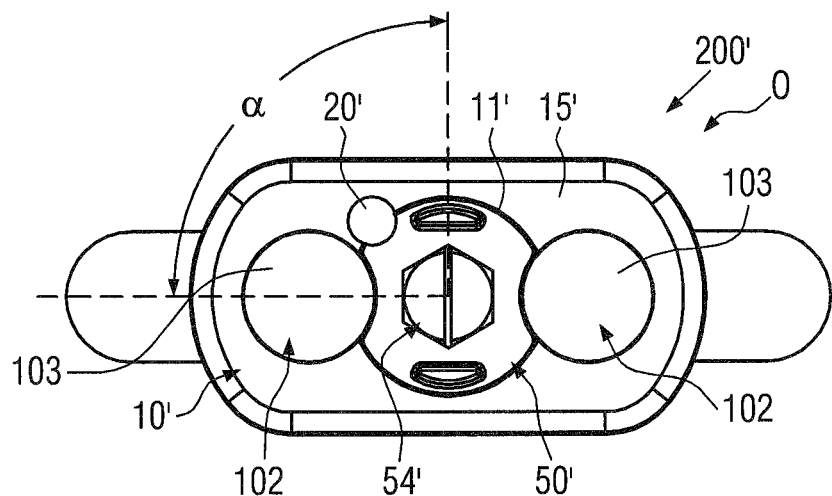
FIG. 18 is a schematic view from below of the connecting link shown in FIG. 16, with the closure assembly.

FIG. 18 shows the annular lock 200' at the open position O, seen in the attachment direction T and in the insertion direction V, so that the lower surface 15' of the closure element 10' and the rotary lock 50' accommodated in the rotary lock reception member 11' are visible. Here, it can clearly be seen that, at the open position O, the operating member 54' and the locking body 52' have been rotated by an adjustment angle α' relative to the closed position S. The adjustment angle α' may be an angle between 80° and 100°, preferably an angel of approximately 90°.

Figure 19:
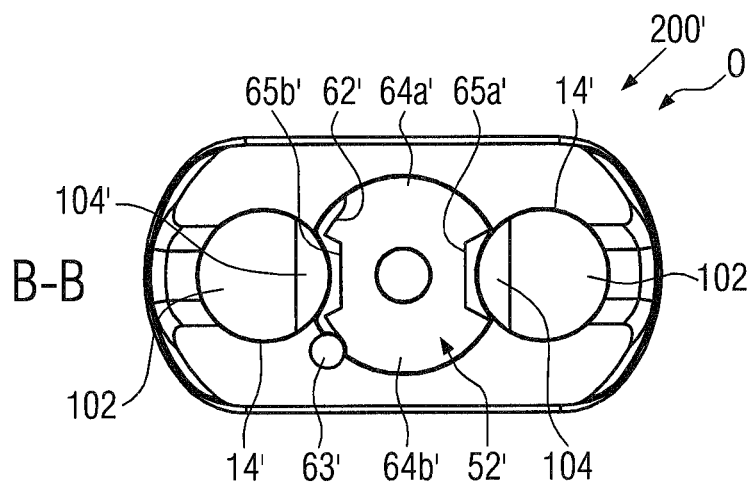
FIG. 19 is a schematic cross-sectional view of the connecting link shown in FIG. 16, with the closure assembly, along section line B-B shown in FIG. 16.

FIG. 19 shows the annular lock 200' in a schematic cross-sectional view along the section line B-B shown in FIG. 16. Here, it can be seen that, in the open position O, the release elements 65a', 65b' have been rotated towards the leg reception member 14' and that, simultaneously, the locking elements 64a', 64b' have been rotated away from the leg reception member 14' and out of engagement with the engagement portions 104 of the legs 101 of the connecting link 100. In addition, the latching element 62' has been rotated past the counter latching element 63' and the locking body 52' has thus been locked at the open position O.

Figure 20:
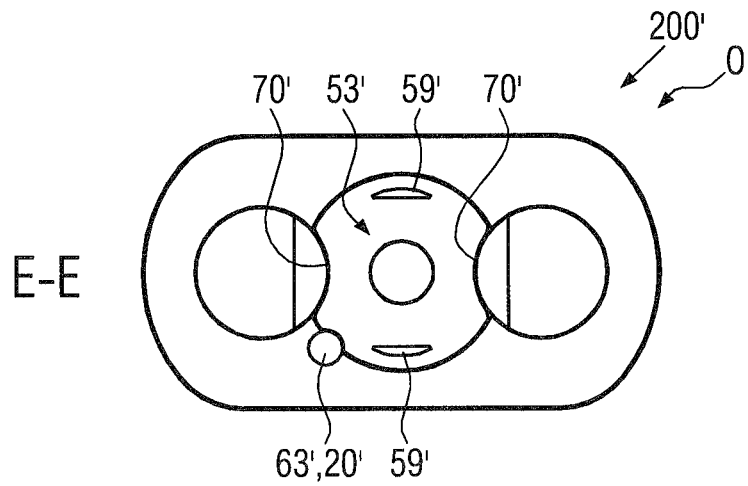
FIG. 20 is a schematic cross-sectional view of the connecting link shown in FIG. 16, with the closure assembly, along section line E-E shown in FIG. 16.

FIG. 20 shows the annular lock 200' in a schematic cross-sectional view along the section line E-E shown in FIG. 16. Here, it can clearly be seen that, in this section plane, no changes have taken place in comparison with the representation of the annular lock 200' at the closed position S in FIG. 15, since the anti-rotation member 20' holds the retaining member 53' at a predefined position of rotation. In addition, it can be seen that the anti-rotation member 20' fulfils a dual function as a counter latching element 63' insofar as it is arranged on the outer contour of the retaining member 53' as well as on the outer contour of the locking body 52'. The anti-rotation member 20' with the dual function as counter latching element 63' can thus be formed integrally.

In the above described embodiments, like elements are identified by like reference numerals. Elements in different embodiments fulfilling an identical or at least a similar function are identified by reference numerals with an apostrophe so as to underline their analogy. Deviations from the above embodiments are possible within the scope of the inventive concept.

For example, an annular lock 200, 200' according to the present invention may be configured such that it satisfies the respective demands in cooperation with a connecting link 100. Instead of a connecting link 100, also other elements to be closed can be closed with the closure assembly 1, 1' according to the present invention. The connecting link 100 may have legs, which are configured in accordance with the respective demands and which may define a reception area 106 and an opening 105 formed between them.

The closure element 10, 10' may be configured with a rotary lock reception member 11, 11', which is configured in accordance with the respective demands and which includes an adequate locking portion 12, 12' and a retaining portion 13', 13'. The leg reception member 14, 14' may have cross-sections adapted to the respective legs 101 to be accommodated and may be connected to the rotary lock reception member 11, 11' in accordance with the respective demands. Accordingly, also the connection portions 16, 16', the cover portions 17, 17', the lateral surfaces 18, 18', the end faces 19, 19' and the anti-rotation members 20, 20' may be configured in accordance with the respective demands. It is not absolutely necessary to provide the closure element 10, 10' with a cover portion 17, 17', but a cover portion 17, 17' will protect the rotary lock 50, 50' against mechanical impacts and detrimental environmental influences.

The rotary lock 50, 50' may be provided with a locking body 52, 52' configured in accordance with the respective demands, a retaining member 53, 53' and an operating member 54, 54' cooperating therewith. The locking body 52, 52' and the retaining member 53, 53' should generally be configured as solid steel or metal elements. The locking body 52, 52' and the retaining member 53, 53' may be configured, at least sectionwise, as spring elements and fulfil respective spring and locking functions. The locking body 52, 52' and/or the retaining member 53, 53' as well as support elements 60a, 60a', arresting elements 60b, 60b', latching elements 62a, 62a', 62b, 62b', the counter latching elements 63, 63', locking portions 64, 64', release portions 65, 65' and guide means 67 formed on said locking body 52, 52' and/or said retaining member 53, 53' or adjoining them and/or the rotary lock reception member 11, 11' may, at least sectionwise, consist of an elastic material or be configured as elastomeric bodies, so that, when operated or rotated relative to one another, they can undergo elastic deformation and thus fulfil locking and spring functions.

The operating element 55, 55' of the operating member 54, 54' may be configured in accordance with the respective demands so as to cooperate with an arbitrary operating tool (not shown) preferably in a form fit manner. The respective retaining areas 56, 56', locking areas 57, 57' and spring areas 58, 58' of the operating member 54, 54' may have an arbitrary structural design so as to connect the locking body 52, 52' to the operating member 54, 54' in a torsion-transmitting manner or extend through the retaining member 53, 53' in a freely rotatable manner. The spring elements 59, 59' may be configured and arranged in accordance with the respective demands. Accordingly, also the spring area 58, 58' is configurable in accordance with the respective demands. A rotary axle of the rotary lock may comprise the operating member 54, 54', the retaining area 56, 56', the locking area 57, 57' and/or the spring area 58, 58', which should be connected to one another in a rotationally rigid manner, but which need not necessarily be formed integrally with one another.

In addition, the support elements 60a, 60 a', arresting elements 60b, 60b', arresting aids 61, 61', latching elements 62a, 62a', 62b, 62b', 62', counter latching elements 63, 63', locking portions 64, 64', locking elements 64a, 64a', 64b, 64b' may be configured for arbitrary cooperation with one another so as to fulfil their respective function. Release portions 65, 65' may be provided with release elements 65a, 65a', 65b, 65b' in an arbitrary manner so as to lock the legs 101 at the closed position S and release them at the open position O. Also operating openings 66, 66', guide means 67, retaining elements 68, 68', retaining openings 69 and recesses 70, 70' may be configured in accordance with the respective demands.

Finally, the adjustment angles α, α' can be chosen in accordance with the respective demands and should preferably be configured such that the open position O and the closed position S can be delimited from one another in an unequivocally defined manner. It is not absolutely necessary, but advantageous, when the attachment direction T and the insertion direction V on the one hand as well as the detachment direction U and the removal direction W on the other are oriented in the same direction.

REFERENCE NUMERALS 1, 1' closure assembly
10, 10' closure element
11, 11' rotary lock reception member
12, 12' locking portion
13, 13' retaining portion
14, 14' leg reception member
15, 15' lower surface
16, 16' connection portion
17, 17' cover portion
18, 18' lateral surfaces
19, 19' end faces
20, 20' anti-rotation member
50, 50' rotary lock 52, 52' locking body
52a upper surface of the locking body
53, 53' retaining member
54, 54' operating member
55, 55' operating element
56, 56' retaining area
57, 57' locking area
58, 58' spring area
59, 59' spring element
60a, 60a' support element
60b, 60b' arresting element
61, 61' arresting aid
62a, 62a' latching element (closed position)
62b, 62b' latching element (open position)
63, 63' counter latching element
64, 64' locking portion
64a, 64a' locking element
64b, 64b' locking element
65, 65' release portion
65a, 65a' release element
65b, 65b' release element
66, 66' operating opening
67 guide means
68, 68' retaining element
69 retaining opening
70, 70' recesses
100 connecting link
101 legs
102 end portion of the leg
103 free end
104 engagement portions
105 opening
106 reception area
107 annular portion
108 yoke
109 ring halves
200, 200' annular lock
M center axis
O open position
S closed position
T attachment direction
U detachment direction
V insertion direction
W removal direction
$d_{64}$ locking/closing diameter
$d_{65}$ release/open diameter
α adjustment angle
α' adjustment angle

The invention claimed is:

1. A closure assembly for closing a connecting link of a tire chain, comprising:
   a closure element comprising
     a leg reception aperture configured to receive a leg of the connecting link; and
     a rotary lock reception member defining a rotary lock aperture connected to the leg reception aperture;
   a rotary lock rotatably received within the rotary lock reception aperture, wherein
   in a closed position, the rotary lock projects into the leg reception aperture to lock the leg of the connecting link within the leg reception aperture;
   a locking portion, in which a locking body of the rotary lock is accommodated;
   a retaining portion, in which a retaining member of the rotary lock is accommodated, wherein the retaining member is rotatably connected to the locking body, wherein in an open position of the rotary lock, the locking body is covered by the retaining member along a portion of a longitudinal length of the rotary lock reception aperture.

2. A closure assembly for closing a connecting link of a tire chain, comprising:
   a closure element comprising
     a leg reception aperture configured to receive a leg of the connecting link; and
     a rotary lock reception member defining a rotary lock aperture connected to the leg reception aperture;
   a rotary lock rotatably received within the rotary lock reception aperture, wherein
   in a closed position, the rotary lock projects into the leg reception aperture to lock the leg of the connecting link within the leg reception aperture;
   a locking portion, in which a locking body of the rotary lock is accommodated;
   a retaining portion, in which a retaining member of the rotary lock is accommodated, wherein the retaining member is rotatably connected to the locking body;
   an anti-rotation member arranged on an inner circumferential side of the retaining portion; and
   a retaining element arranged on an outer circumferential side of the retaining member; wherein the anti-rotation member cooperates with the retaining element to substantially prevent the retaining member from rotating.

3. The closure assembly of claim 2, wherein a first end of the rotary lock reception aperture is defined an outer surface of the closure element.

4. The closure assembly according to claim 2, wherein
   the leg reception aperture comprises a first leg reception aperture and a second leg aperture; and
   the rotary lock reception aperture is arranged centrally between the first and second leg reception apertures.

5. The closure assembly according to claim 2 further comprising an operating member connected to the locking body in a torsionally rigid manner, wherein the operating member is accessible from outside.

6. The closure assembly according to claim 5, wherein the operating member is formed on a rotary axle on which the locking body and the retaining member are arranged.

7. The closure assembly according to claim 2, wherein
   the locking body includes a latching element; and
   the retaining member includes a counter latching element; wherein
   in a closed position of the rotary lock, the latching element lockingly engages the at counter latching element and the locking body is secured against rotation relative to the retaining member.

8. The closure assembly according to claim 2, further comprising a spring element operably connected to the locking body, wherein the spring element biases the locking body towards the retaining member.

9. The closure assembly according to claim 8, wherein the spring element comprises an elastomeric body.

10. The closure assembly according to claim 2, wherein the retaining element is a retaining recess.

11. A connecting link for connecting two links of a tire chain comprising:
    two legs interconnected via a yoke, wherein at least one of the legs comprises an engagement portion configured to connect to the locking portion of claim 2.

12. A tire protection chain comprising at least one of the connecting link of claim 11 connecting two links of a tire chain.

13. A closure assembly for closing a connecting link of a tire chain, comprising:

a closure element comprising
   a leg reception aperture configured to receive a leg of the connecting link; and
   a rotary lock reception member defining a rotary lock aperture connected to the leg reception aperture;
a rotary lock rotatably received within the rotary lock reception aperture, wherein
in a closed position, the rotary lock projects into the leg reception aperture to lock the leg of the connecting link within the leg reception aperture;
a locking portion, in which a locking body of the rotary lock is accommodated;
a retaining portion, in which a retaining member of the rotary lock is accommodated, wherein the retaining member is rotatably connected to the locking body, wherein the locking body comprises
   at least one locking portion; and
   a release portion;
   wherein a locking diameter of the at least one locking portion is larger than a release diameter of the release portion.

* * * * *